United States Patent [19]
Bigo et al.

[11] Patent Number: 5,857,040
[45] Date of Patent: Jan. 5, 1999

[54] ADJUSTABLE OPTICAL AMPLITUDE AND PHASE MODULATOR, AND A SOLITON REGENERATOR INCLUDING SUCH A MODULATOR

[75] Inventors: Sébastien Bigo, Palaiseau; Emmanuel Desurvire, Bruyeres Le Chatel, both of France

[73] Assignee: Alcatel Submarine Networks, Clichy, France

[21] Appl. No.: 769,129

[22] Filed: Dec. 18, 1996

[30] Foreign Application Priority Data

Dec. 21, 1995 [FR] France .................................. 95 15282

[51] Int. Cl.$^6$ ...................................................... G02B 6/26
[52] U.S. Cl. ................................ 385/15; 372/6; 359/156
[58] Field of Search .................... 372/6, 94, 25, 372/18; 385/1, 2, 9, 11, 25, 37, 122–127, 135, 173, 182, 195, 246; 359/156, 188

[56] References Cited

U.S. PATENT DOCUMENTS

| | | | |
|---|---|---|---|
| 5,050,183 | 9/1991 | Duling, III | 372/6 X |
| 5,111,322 | 5/1992 | Bergano et al. | 385/1 X |
| 5,608,560 | 3/1997 | Abram et al. | 359/156 |
| 5,689,596 | 11/1997 | Evans | 372/6 |

FOREIGN PATENT DOCUMENTS

| | | |
|---|---|---|
| 0571134A1 | 11/1993 | European Pat. Off. . |
| 059520A1 | 5/1994 | European Pat. Off. . |

OTHER PUBLICATIONS

"A walk–off nalanced Nonlinear Fiber loop Mirror Switch", IEEE Photonics Technology Letters By Lee et al., vol. 7, No. 12, pp. 1441–1443, Dec. 1995.

Hak Kyu Lee et al, "A Walk–Off Balanced Nonlineare Fiber Loop Mirror Switch", *IEEE Photonics Technology Letters*, vol. 7, No. 12, 1 Dec. 1995, pp. 1441–1443.

J. K. Lucek et al, "All–Optical Signal Regenerator", *Optics Letters*, vol. 18, No. 15, 1 Aug. 1993, pp. 1226–1228.

P–L Francis et al, "Reduction of averaged soliton interaction forces by amplitude modulation", *Optics Letters*, 15 Apr. 1993, vol. 18, No. 8, ISSN 0146–9592, pp. 583–585.

*Primary Examiner*—Akm E. Ullah
*Attorney, Agent, or Firm*—Sughrue, Mion, Zinn, Macpeak & Seas, PLLC

[57] ABSTRACT

The invention relates to an adjustable optical amplitude and phase modulator using a non-linear optical loop mirror having two control inlets and a signal inlet. In a preferred embodiment, a single clock signal is split into two and applied to the two control inlets. The invention also relates to a soliton regenerator including said optical modulator. In an important variant, said modulator receives a soliton bit train on its signal inlet at a bit rate $f_s$, and on its control inlets it receives a clock signal at half that frequency $f_c=f_s/2$. In an advantageous embodiment, said clock signal is applied with a phase shift of $\pi$ between the two control inlets, so as to minimize the effects of collisions between solitons. The invention is applicable to long distance telecommunications by optical fiber.

20 Claims, 9 Drawing Sheets

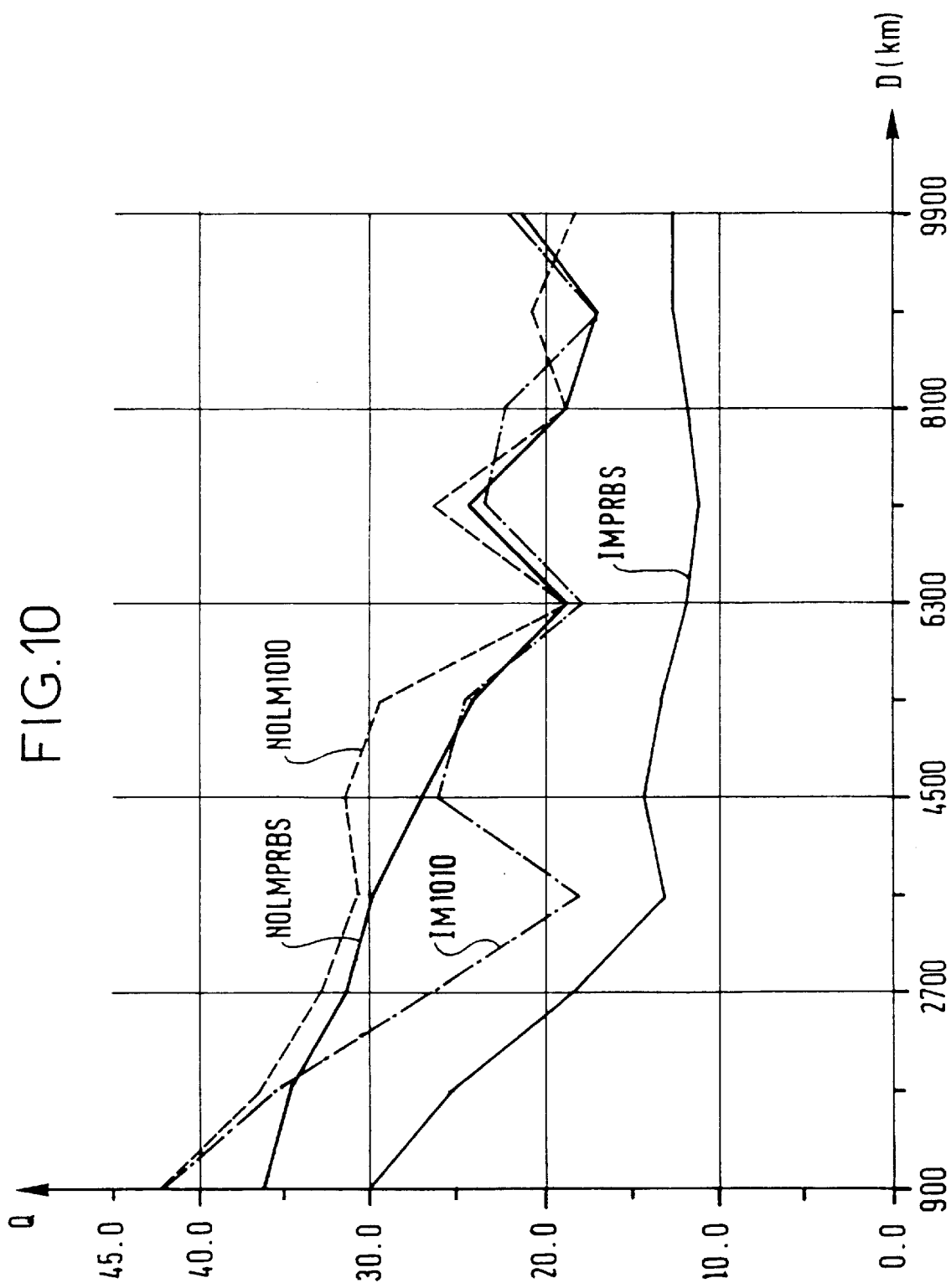

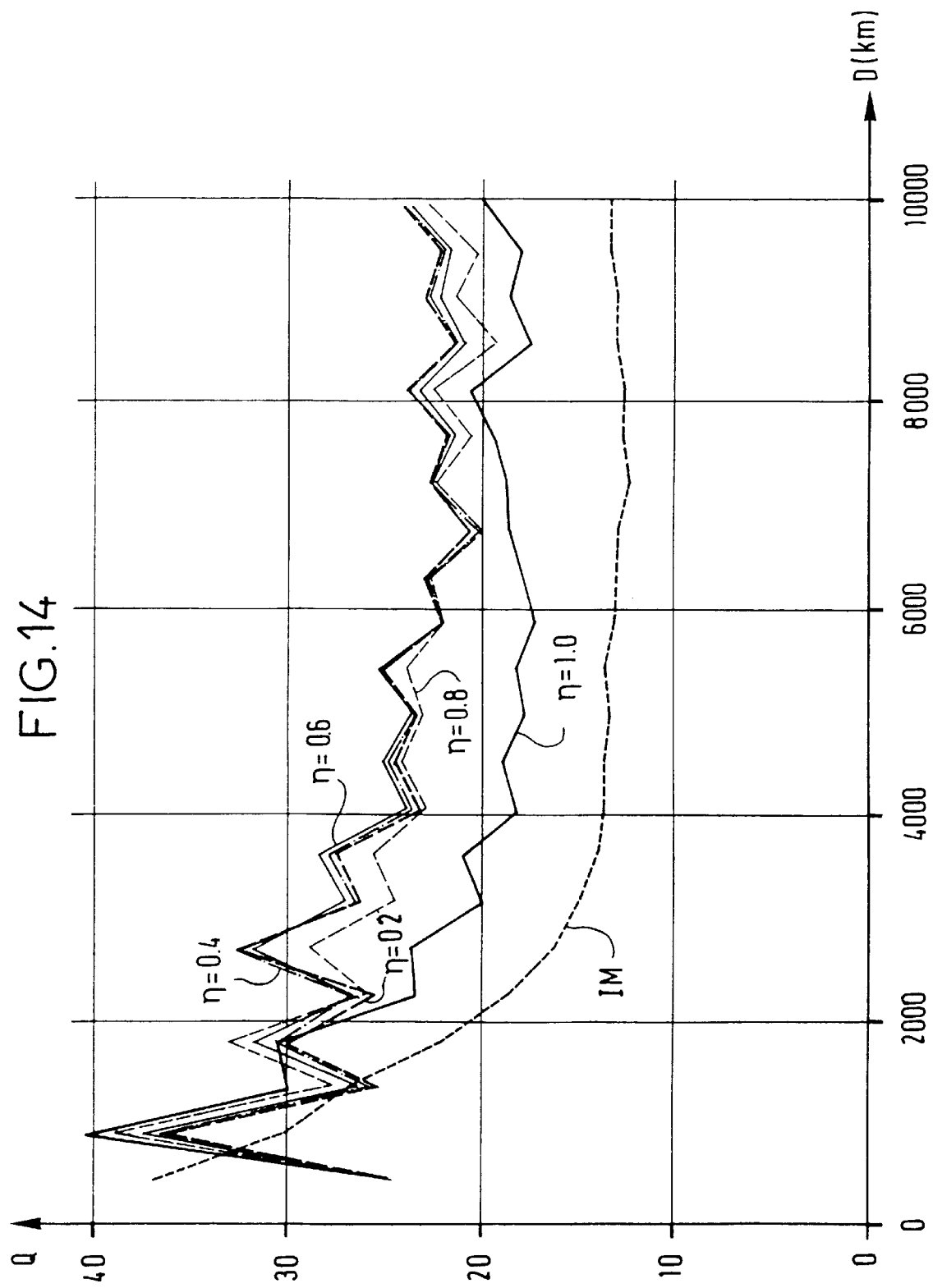

ADJUSTABLE OPTICAL AMPLITUDE AND PHASE MODULATOR, AND A SOLITON REGENERATOR INCLUDING SUCH A MODULATOR

The invention relates to the field of optical fiber telecommunications, and more particularly telecommunications over long distances. For very long distance optical fiber links, it is known that a "soliton" type signal can be used which has special spectral properties enabling the signal to propagate along a dispersive fiber without significant chromatic dispersion, i.e. use is made of the dependence of the refractive index on the intensity of the signal to oppose chromatic dispersion, or vice versa. The spectral form of the signal is preserved in spite of the effects of distance on propagation, which effects are thus comprised mainly by line losses. Such line losses can be compensated by in-line optical amplification, e.g. using an erbrium-doped fiber amplifier (EDFA).

BACKGROUND OF THE INVENTION

For soliton transmission with in-line amplification (by EDFA), the problems that remain to be solved are known:

1) Gordon-Haus jitter which causes uncertainty concerning the arrival times of signal bits; and
2) the accumulation of noise due to spontaneous emission being amplified in the optical amplifiers.

Various solutions have been proposed and described in the following documents which are expressly incorporated in the present application as descriptions of the prior art:

1) synchronous modulation with filtering, D1=H. Kubota and M. Nakazawa, (1983), "Soliton transmission control in time and frequency domains", ILS J. Quantum Electronic, Vol. 29, No. 7, pp. 2189–2197, July 1993, demonstrates the theoretical advantage of the method by calculation. No practical solution is recommended, but reference is made to an experimental transmission at 10 Gbit/s over 1 million kilometers in D2=Nakazawa et al. (1991), "Experimental demonstration of soliton data transmission over unlimited distances with soliton control in time and frequency domains", Electronics Letters, Vol. 29, No. 9, pp. 729–730, Apr. 29, 1993.

Document D2 teaches the use of an $LiNO_3$ optical modulator for performing synchronous modulation of solitons, as shown diagrammatically in FIG. 2. The problem with that solution is that the signal rate to be regenerated cannot exceed 20 to 30 Gbit/s (10 Gbit/s in document D2). The $LiNO_3$ modulator MOD is controlled by an electronic control signal generated in a clock circuit from the in-line soliton signal. The clock recovery means comprise: an optical coupler C5 for extracting a portion of the optical signal propagating between the inlet F1 and the outlet F2; a clock extractor circuit CLKX; a delay line for providing a delay DEL; and an amplifier GM for providing the control power necessary for operating the $LiNO_3$ modulator MOD. FIG. 2 also shows: an inlet optical amplifier (EDFA) for overcoming the insertion losses of the regenerator circuit; birefringent polarization control devices (PC); and a bandpass filter BP for narrowing the spectral distribution of energy in the solitons. Some of those accessories are to be found in the preferred embodiments of the invention as described below.

A system is also known for regenerating an optical signal in the form of a train of bits constituted by light pulses for "1" bits and by lack of pulses for "0" bits at predetermined moments known to a clock: D3=J. K. Lucek and K. Smith, (1993), "All-optical signal regenerator", Opt. Lett., Vol. 18, No. 15, pp. 1226–1228, Aug. 1, 1993.

Other documents are helpful in obtaining a better understanding of the present invention and are presented briefly with a summary of their contributions for this purpose. Those documents are also expressly incorporated in the present application as descriptions of the prior art:

D4=K. Smith and J. K. Lucek, (1992) "All-optical clock recovery using a mode locked laser", Elect. Lett. 28 (19), p. 1814, Sep. 10, 1992. That document describes all-optical clock recovery from a soliton signal by locking the modes of an optical fiber ring laser by injecting said soliton signal into the ring.

D5=L. E. Adams et al., (1994) "All-optical clock recovery using a mode locked figure-eight laser with a semiconductor nonlinearity", Electron. Lett., Vol. 30, No. 20, pp. 1696–1697, Sep. 29, 1994. That document teaches the use of a mode locked laser for all-optical clock recovery. All-optical clock recovery can be used in soliton regenerator apparatus using an optical modulator of the invention to provide the control signal(s) of said optical modulator.

D6=P. L. Frangois and T. Georges, (1993) "Reduction of averaged soliton interaction forces by amplitude modulation", Optics Lett. 18 (8), p. 583, Apr. 15, 1993. That document describes comparison by computer simulation of three methods of soliton signal modulation: 1) amplitude modulation only; 2) applying alternating phases ($\pm\pi$) to successive solitons; and 3) amplitude modulation with the application of alternating phases to successive solitons. The first method is effective only for resetting the time positions of soliton pulses for the purpose of eliminating Gordon-Haus jitter. The second method is effective for obtaining a reduction in interaction forces (collisions) between adjacent solitons on the propagation waveguide. The third method obtains simultaneously the advantages of both the preceding methods.

D7=K. Uchiyama et al., (1992) "Ultrafast polarization-independent all-optical switching using a polarization diversity scheme in the nonlinear optical loop mirror (NOLM)", Electron. Lett., Vol. 28, No. 20, pp. 1864–1866, Sep. 24, 1992. That document shows the use of a NOLM as a switch, which is made insensitive to the polarization of the light in the signal to be switched. This is obtained by using a polarization-maintaining fiber which is cut and twisted through 90° at the midpoint of the NOLM loop. The principle thereof is shown in FIG. 4.

By way of example, the loop of the NOLM is constituted by a PANDA polarization-maintaining fiber having two holes. By 90° rotation between the axes A1 and A2 halfway along the propagation path, the fast axis of the lefthand portion becomes the slow axis of the righthand portion of the loop shown in FIG. 4 (and the left slow axis becomes the right fast axis). The fiber of the loop (L) is polarization dispersive, i.e. the speed of light propagation within the fiber is different for polarization that is in alignment with the fast axis and for polarization that is orthogonal to the fast propagation axis, i.e. the slow axis of the fiber. It is necessary to overcome polarization dispersion, and this is done by using two identical lengths of fiber having their polarization-maintaining axes A1 and A2 in a mutually orthogonal disposition, thus having the effect of cancelling polarization dispersion.

To make the system independent of the polarization of the switched signal, the polarization of the control signal which is injected into the loop L via the coupler C2 on the control inlet fiber F3 is injected at 45° to the two orthogonal axes A1 and A2. In the same manner as above, the effects of polarization dispersion cancel.

D8=French patent application FR 94/15555 of Dec. 23, 1994 in the name of Alcatel N. V. and entitled "Dispositif de régénération en ligne d'un signal transmis par solitons via la modulation synchrone des solitons à l'aide d'un miroir optique non-linéaire" [Apparatus for in-line regeneration of a signal transmitted by solitons by synchronous modulation of the solitons using a non-linear optical mirror]. In the opinion of the Applicant, that document, still unpublished at the date of the present application, is the closest document in the prior art for assessing the contribution of the present invention.

The apparatus described in D8 regenerates solitons in line by synchronous modulation of the solitons using a non-linear optical mirror (NOLM) as an optical modulator, the NOLM modulator being controlled by a clock signal recovered from the soliton signal by clock recovery means which may be all-optical means or electro-optical means. The NOLM includes an inlet coupler C1 which may be a 50/50 coupler or an asymmetrical coupler. Said inlet coupler C1 may be a 2×2 or a 3×3 coupler. In a particular embodiment, the regenerator system also includes a plurality of optical amplifiers and a plurality of filters referred to as "guiding" filters. As in the context of the present invention, the intended application is optical telecommunications over great distances by means of solitons.

Like D4, document D8 teaches the use of optical clock recovery by locking the modes of a loop fiber laser in a NOLM operating independently of the polarization of the control signal in application of the teaching of D7, but used as an optical modulator and not as an optical switch (as disclosed in D3 and D7).

The optical modulator taught by document D8 is mainly an amplitude modulator, but inevitably it introduces a component of phase modulation of greater or smaller magnitude, depending on the relative amplitude and waveform of the control signal injected into the NOLM. Said phase modulation is not detrimental in itself, but since it is not possible to optimize it independently, the phase modulation introduces a "chirp" effect, meaning that the amount of phase modulation depends on the frequency of the modulated wave, thus having a harmful effect on the spectral composition of solitons modulated in this way.

D9=Hak Kyu Lee et al., "A walk-off balanced NFLM switch controlled by 1.5 μm pulses for high bit rate 1.3 μm telecommunications", Proc. 21st Eur. Conf. on Opt. Comm. (ECOC '95), Brussels, p. 401. Document D9 teaches the use of two control inlets in a NOLM to avoid phase slip ("walk off") between the control signal and the signal to be switched. In that case the NOLM acts only as a switch (as in D3 and in D7) and not as a modulator (as in D8 and in the present invention). The clock signals presented to the control inlets are not phase-shifted as in that prior art.

OBJECT AND SUMMARY OF THE INVENTION

The object of the invention is to mitigate the problems of the prior art.

To this end, the invention provides an optical signal amplitude modulator comprising a non-linear optical loop mirror or "NOLM", said NOLM including an optical fiber loop, said loop having an inlet signal and an outlet signal and a first signal inlet/outlet optical coupler C1 having a coupling coefficient of $\xi/(1-\xi)$ for coupling said inlet and said outlet to said loop, said NOLM further including a first control inlet and a second optical coupler C2 for coupling said first control inlet to said loop in order to enable a first control optical signal to be injected into said loop in a first propagation direction, wherein said NOLM further includes a second control inlet and a third optical coupler C3 in order to enable a second optical control signal to be injected into said loop in a second propagation direction different from said first direction.

In an advantageous embodiment, said optical modulator further includes means ΔA for adjusting the relative amplitude of said first and second optical control signals. In a preferred embodiment, said optical modulator further includes means ΔΦ to adjust the relative phase of said first and second optical control signals.

In a variant, said optical modulator further includes at least one light source for generating said first and second optical control signals. In a preferred embodiment, said at least one light source is suitable for generating a periodic control signal that is approximately or substantially sinusoidal. In a preferred embodiment, said at least one light source is a single source, and said modulator further includes a fourth optical coupler C4 enabling said periodic control signal to be split into two, thereby creating said first and second optical control signals.

In a preferred embodiment, the relative phase between said first and second periodic control signals (which are approximately or substantially sinusoidal) is approximately $\xi$.

The invention also provides a method of regenerating solitons in which solitons to be regenerated are injected to the signal inlet of a NOLM via a first inlet/outlet optical coupler C1 having a coupling coefficient of $\xi/(1-\xi)$, while a first optical control signal is injected into the NOLM in a first propagation direction via a second optical coupler C2 in order to modulate said solitons by said first optical control signal and to deliver said solitons modulated in this way via said first optical coupler C1, wherein a second optical control signal is injected into the NOLM in a second propagation direction via a third optical coupler C3, the second propagation direction being different from the first, and said first and second optical control signals having a relative phase shift of approximately $\xi$.

In a preferred implementation, said first and second optical signals are approximately sinusoidal waveforms.

The invention also provides the use of an optical modulator device according to any of the above-specified variants, either for regenerating solitons, or else for modifying the spectral characteristics of pulses ("chirp").

BRIEF DESCRIPTION OF THE DRAWINGS

The invention will be better understood together with its various characteristics and advantages in the light of the following detailed description, and the accompanying drawings, in which:

FIG. 10 shows the effect of interactions between solitons as obtained by digital simulation of the quality factor Q as a function of link length D over transoceanic distances, for a pseudo-random signal and for a signal made up of a train of simply alternating bits, both for intensity modulation only and also for phase-and-amplitude modulation by means of a NOLM having two control inlets in accordance with the invention, with $p_c/P_\xi=0.2$ on each inlet;

FIG. 14 shows the results of digital simulation of the quality factor Q as a function of link length D over transoceanic distances for various values of control power $P_c$ applied in phase opposition to the two control inlets of a NOLM of an optical modulator of the invention.

The drawings are given as non-limiting examples, in order to illustrate the principles of the invention and a few variants thereof. In all the figures, the same references refer to the same elements, and the figures are not always to scale for reasons of clarity.

MORE DETAILED DESCRIPTION

Figure 1:
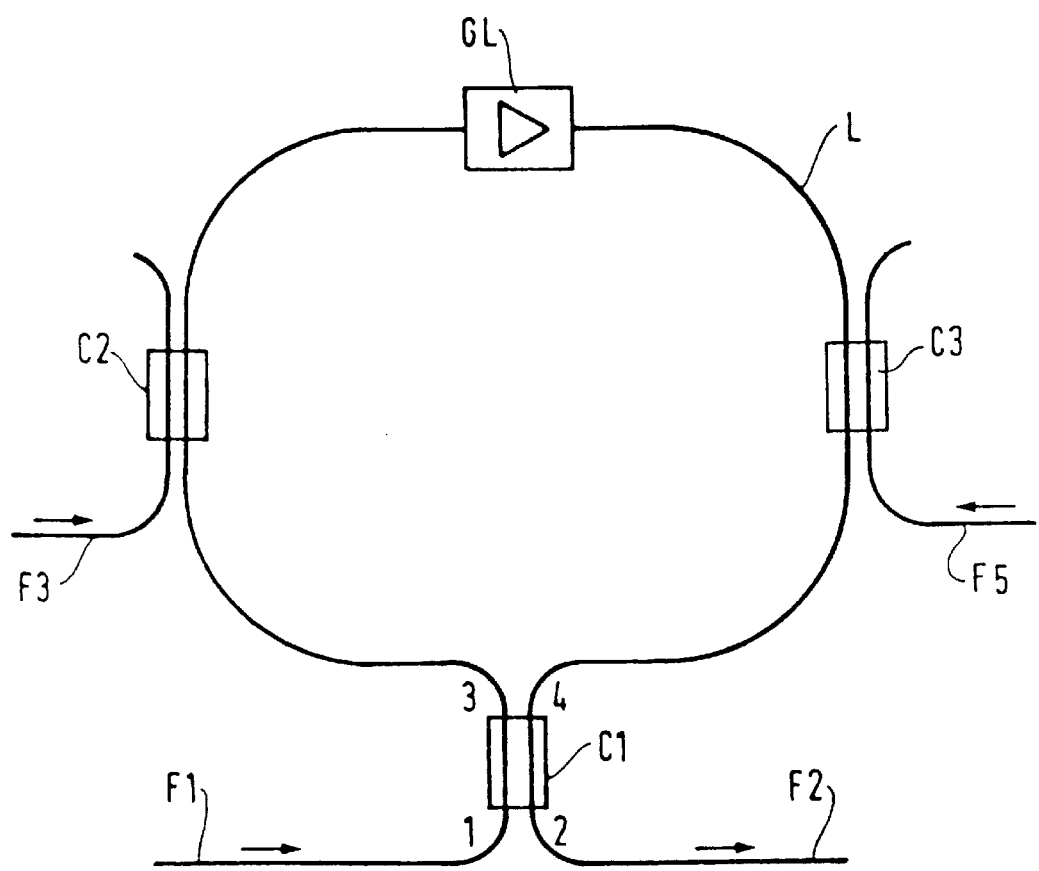
FIG. 1 is a diagram showing an example of a non-linear optical-loop mirror (NOLM) modified by adding a second control stage and adapted to be used in an optical modulator of the invention.
Figure 2:
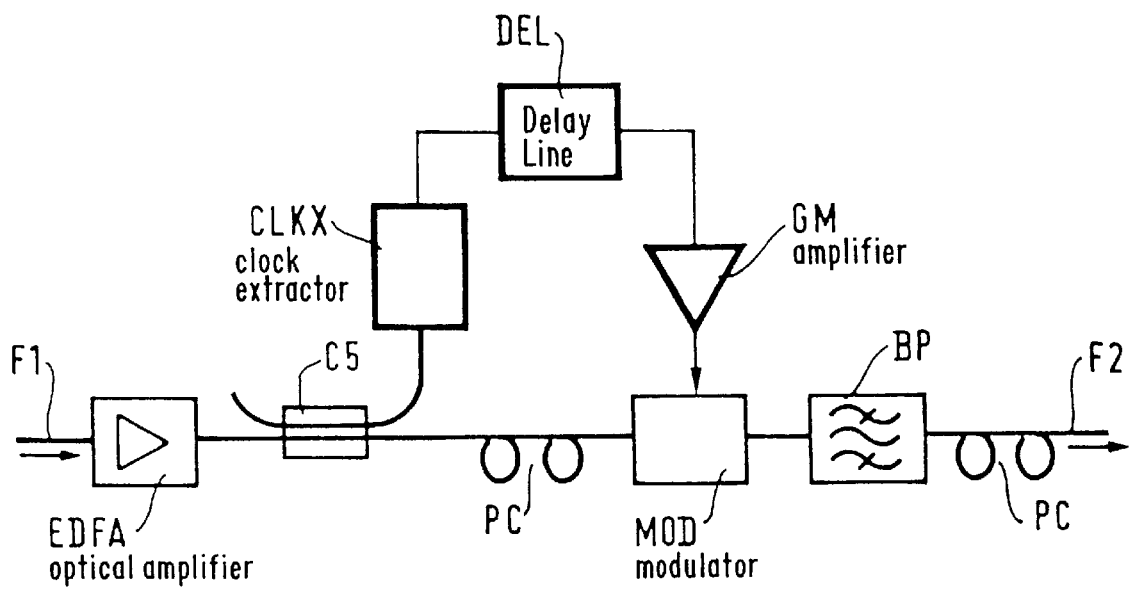
FIG. 2, described above, is a diagram showing apparatus for synchronous modulation of solitons, and as disclosed in the prior art by document D2.

FIG. 1 is a diagram showing an example of a non-linear optical loop mirror (NOLM) suitable for use in an optical modulator of the invention. In general, a NOLM comprises: an optical fiber loop L; a first optical coupler C1 having four ports 1, 2, 3, and 4, said coupler C1 having a coupling coefficient $\xi/(1-\xi)$ which describes the optical power sharing between the various ports; and a second optical coupler C2 for injecting a first control signal into the NOLM via a first control optical fiber F3.

That which characterizes the NOLM of the optical modulator of the invention is the addition of a second control inlet via a third optical coupler C3 enabling a second control signal to be injected from a second control fiber F5. This second control signal is injected into the loop of the NOLM in a propagation direction opposite to that of said first control signal.

An optical amplifier GL may optionally be included in the loop to impart positive gain overall, thus constituting a non-linear amplifying loop mirror (NALM); otherwise such an amplifier may serve to compensate for insertion losses and impart unity gain overall.

The optical signal to be switched by the NOLM is injected by the inlet fiber F1 to port 1 of the coupler C1. We begin by describing the case when the coupling coefficient $\xi/(1-\xi)$ of the coupler C1 is 50/50, in the absence of any control signal on the fiber F3. In this case, 50% of the power of said optical signal appears on port 4 while the other 50% appears on port 3 of the coupler C1, but phase-shifted relative thereto by $\xi/2$ radians (90°). The two signals therefore propagate in opposite directions around the fiber loop, which will be on the order of 5 km to 10 km in length. Since the paths followed by the two optical signals are identical, the signals reach ports 3 and 4 respectively of the coupler C1 where they interfere. The coupler C1 imparts a further relative phase shift of $\pm\xi/2$.

Since the two signals are now phase-shifted by $\pm\xi$ or 0, there is destructive interference (phase shift of $\pm\xi$) for the resulting wave applied to port 2 of the coupler C1, and thus no transmission of the signal to the outlet fiber F2. In contrast, interference is constructive (phase shift 0) for the resulting wave directed towards port 1 of the coupler C1, so the signal presented at port 1 is totally reflected by the NOLM back to the port 1 in this case.

We now consider the case of a control signal being present on the control optical fiber F3. This signal is coupled to the loop of the NOLM by optical coupler C2, and it propagates in the loop in a clockwise direction. Signal waves travelling round the loop in the opposite direction will be unaffected or little affected by the presence of a control signal. However, signal waves propagating in the same direction around the loop will be disturbed. The fiber of the loop L has non-linear properties whereby the refractive index of the fiber changes as a function of optical power, or more precisely as a function of the amplitude of the electric field in the fiber (the Kerr effect). The electric fields of waves travelling together, said to be "co-propagating", superpose in linear manner so the resulting intensity of the electric field is greater than for waves propagating in the opposite direction around the loop L.

The effective refractive index of the loop L as seen by the co-propagating waves is different from that seen by the counter-propagating waves. Their propagation speeds are therefore different. Their arrival times at the coupler C1 are different so the waves interfere little or not at all. All, or nearly all, of the optical power appears on port 2 of the coupler C1 and is applied to outlet optical fiber F2.

Thus, the presence of a control signal on the control fiber F3 is capable of controlling the switching of the non-linear optical loop mirror, which becomes transparent when a control signal is present and reflective in the absence of such a control signal. Switching can be very fast, taking place at a rate of about 100 GHz, at least. By inserting a birefringent element in the loop of the NOLM, it is possible to invert its switching characteristics, so that it becomes transparent in the absence of a control signal and reflective in the presence of a control signal.

The NOLM as described so far forms part of the prior art and can be used, for example, in apparatus for generating solitons by switching using a clock signal NOLM, as described in document D3.

To mitigate the drawbacks of the prior art, and in particular to enable solitons to be regenerated by synchronous amplitude and phase modulation, with the option of independent control of phase modulation as a function of frequency ("chirp"), the invention proposes an optical modulator device comprising a NOLM having a second control inlet F5 as shown diagrammatically in FIG. 1, whereas in the prior art the NOLM has only one control inlet.

The function of the second control signal is identical to that described above for the first control signal with the exception of propagation direction. The second control signal is injected into the loop L of the NOLM in the opposite direction, i.e. counterclockwise. The Kerr effect induced by this second control signal therefore acts to a greater extent on the portion of the soliton signal that co-propagates with the second control signal, i.e. the portion of the soliton signal injected into the loop L of the NOLM via port 4.

It is thus easy to understand the fundamental difference between the prior art apparatus and that proposed in the context of the present invention. In the prior art NOLM, the portion of the soliton signal entering the NOLM loop via port 3 is modulated by the co-propagating control signal and interferes with the portion of the soliton signal that enters via port 4 which is not disturbed by the control signal. In contrast, in the apparatus of the invention, the portion of the soliton signal entering the loop via port 4 is, in turn, subjected to modulation by the second control signal. This provides means for acting on two independent parameters with independent control signals.

Figure 3:
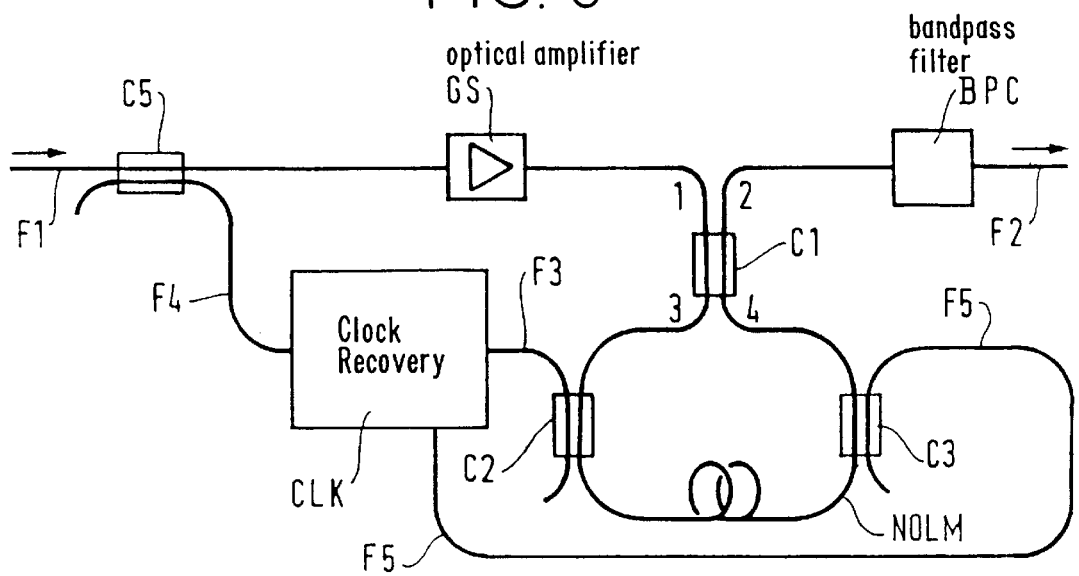
FIG. 3 is a diagram of apparatus for synchronous modulation of solitons embodied in accordance with the invention and in which the modulator is a NOLM having two control inlets.

In the apparatus of FIG. 3, and as described in part in document D8 for a conventional NOLM, the soliton type optical signal to be regenerated arrives via inlet optical fiber F1, from which an optical coupler C5 takes a portion of the signal to extract a clock signal therefrom by clock recovery means CLK. Thereafter, the means CLK apply said optical clock signal to the first control inlet of the NOLM via the coupler C2. The soliton signal is still at the same wavelength $\lambda_s$. The wavelength $\lambda_s$ of the clock signal is preferably slightly different from that of the soliton signal $\lambda_s$ to enable the clock to be filtered out at the outlet of the apparatus by a bandpass filter BPC whose passband is centered on the wavelength $\lambda_s$ of the soliton.

Downstream from the sample-taking coupler C5, the soliton signal continues to propagate along the inlet optical fiber F1 to the inlet port 1 of the coupler C1 of the NOLM. In a variant of the invention, an optical amplifier GS can be placed upstream from the NOLM to compensate for in-line losses suffered by the soliton since the previous time it has been amplified or regenerated.

The NOLM operates in a manner similar to that described above with reference to FIG. 1. Solitons arriving at port 1 of coupler C1 of the NOLM are thus modulated by the first clock signal applied to the control inlet F3 via the control coupler C2. The transit times of the clock and of the solitons along their respective paths may possibly need to be adjusted appropriately to synchronize these two signals as they travel along the NOLM.

The soliton signal is thus modulated by the envelope of the clock signal, thereby enabling the solitons to be amplitude-modulated. Amplitude modulation is deemed to suffice for reducing and even eliminating Gordon-Haus jitter at the outlet from the regenerator apparatus.

Figure 4:
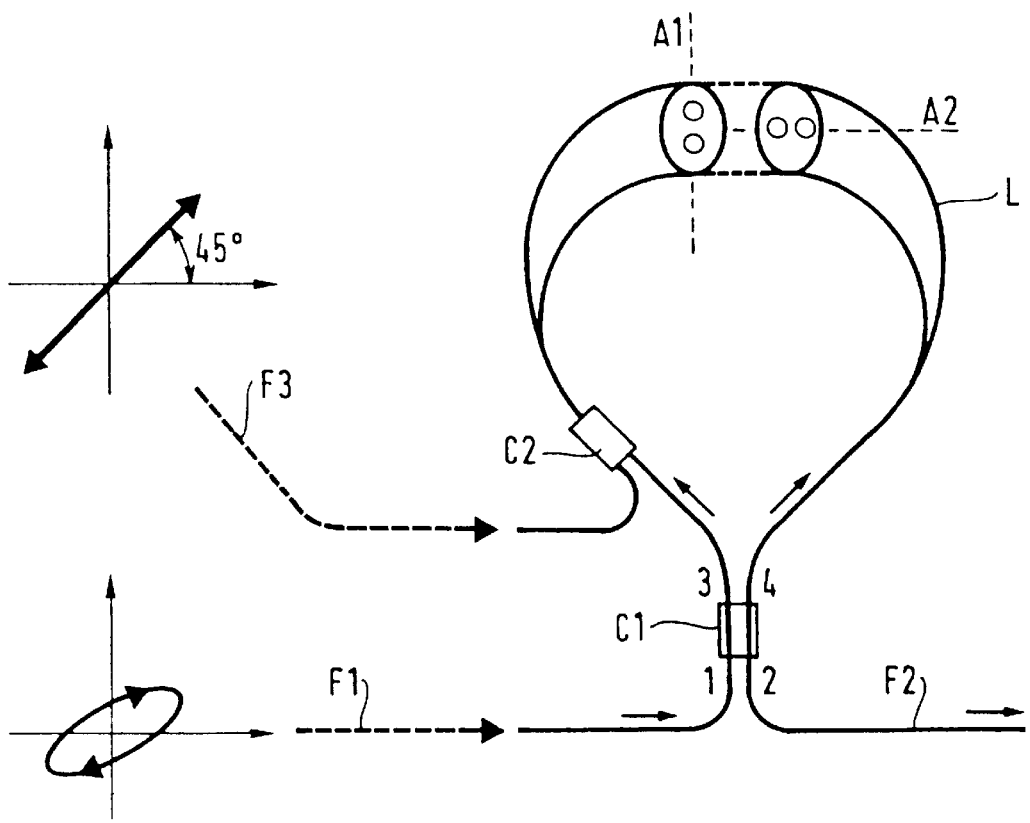
FIG. 4, described above, is a diagram of a NOLM switch that is insensitive to the polarization of the signal to be switched, and as disclosed in the prior art by document D7.

It is preferable to use a polarization-maintaining fiber to make the NOLM of the invention, as shown in above-described FIG. 4. The optical clock signal is injected into the NOLM via the coupler C2 in such a manner as to ensure that its polarization axis is at 45° relative to the polarization-maintaining axes A1 and A2 of the fiber in the loop L. Operation of the apparatus is thus insensitive to the polarization of the soliton signal to be modulated, which constitutes a major advantage over prior art embodiments, in particular those in which the soliton signal constitutes the control signal of the NOLM, since that signal could be of polarization that is arbitrary, and thus unknown, and not under control. The sensitivity of the NOLM to signal polarization can thus degrade the performance of the prior art apparatus.

Figure 5:
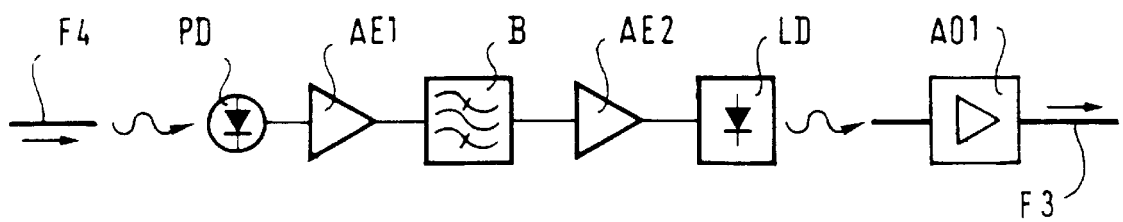
FIG. 5 is a diagram of an example of apparatus for optoelectronic recovery of the clock from an optical signal using principles known to the person skilled in the art.

The clock recovery means CLK may either be all-optical means, or else optoelectronic means (see FIG. 5). FIG. 5 is a diagram of optoelectronic means for recovering a clock from an optical signal using principles known to the person skilled in the art. The optical signal taken by the take-off coupler C5 of FIG. 3 propagates along optical fiber F4 to a photo-detector PD which converts the optical signal into an electronic signal. The electronic signal obtained in this way is initially amplified by a microwave electronic amplifier AE1 and then, for an NRZ (no return to zero) signal, the signal is filtered by a first bandpass filter B. The signal is then amplified to control a laser diode LD which emits a light signal at the same rate as the electronic pulses derived from the optical signals taken by C5. The optical signal may optionally be amplified by an optical amplifier AO1 prior to being applied to the control inlet of the NOLM via the control fiber F3 and the coupler C2 of FIG. 3.

Figure 6:
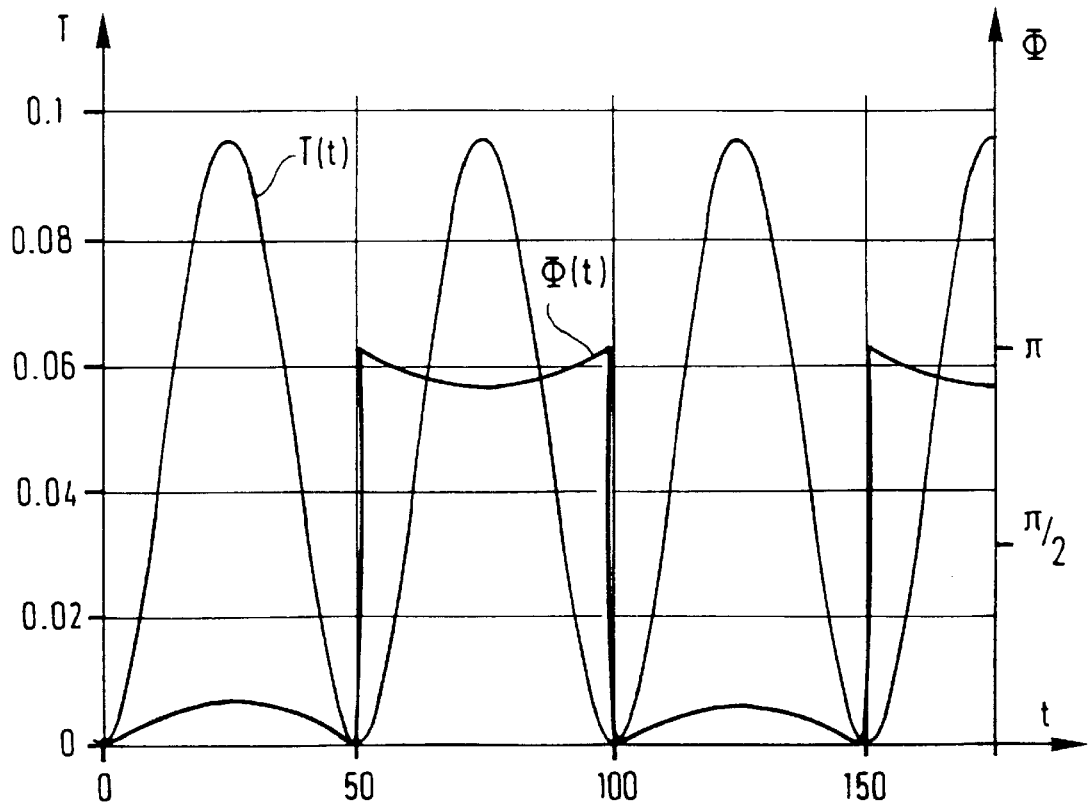
FIG. 6 is a diagram showing the transmittance of a prior art NOLM and also the phase of the control signal as a function of time for a control signal $P_c$ at a power level of about 20% of the power $P_\xi$ required for maximum switching.

FIG. 6 shows the transmittance T and the phase Φ of a conventional NOLM when the power of the control signal $P_c/P_\pi=0.2$. This value for the control signal gives transmittance T that is almost sinusoidal, but it introduces chirp which is visible in the figure. The chirp corresponds to phase variations of a few degrees observed during each period of the transmittance sinusoid. In apparatus known in the prior art, the chirp cannot be controlled, which makes it undesirable for certain transmission conditions. For example, a chirp introduced during regeneration can improve transmission providing it is both equal and opposite to a chirp introduced by the optical transmission line (optical fiber). However that chirp depends on the length of the link as well as on the propagation characteristics of the line, which sets an optimum length of link between regenerators. To avoid that constraint, it would be preferable to be able to control in independent manner the amount of chirp introduced by the optical modulator.

Figure 7:
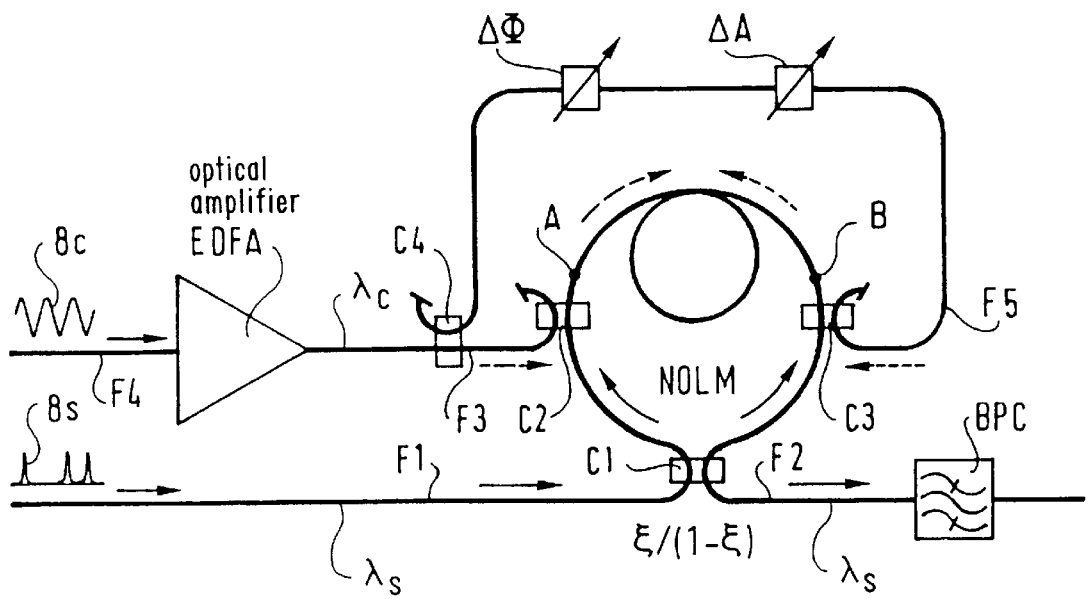
FIG. 7 is a diagram of optical modulator apparatus of the invention.

FIG. 7 is a diagram of a preferred embodiment of the optical modulator apparatus of the invention. As in the apparatus of FIG. 3, the soliton type optical signal to be regenerated of wavelength $\lambda_s$ arrives via inlet optical fiber F1 and is inserted into the loop of the NOLM via coupler C1. A preferably sinusoidal clock signal of wavelength $\lambda_c$ is generated by clock recovery means (not shown) and is injected into the control inlet optical fiber F4 which optionally includes an erbium-doped fiber amplifier EDFA. In this advantageous embodiment, the clock signal is split by an optical coupler C4 to provide two control signals, one of which is applied to the first control inlet of the NOLM via the optical coupler C2 and the other of which is applied to the second control inlet via the optical coupler C3. The soliton signal always has the same wavelength $\lambda_s$, including in the outlet fiber F2 from the apparatus. The wavelength $\lambda_c$ of the clock signal is preferably slightly different from that of the soliton signal $\lambda_s$, so as to enable the clock to be filtered out at the outlet from the apparatus by a bandpass filter BPC whose passband is centered on the wavelength $\lambda^s$ of the soliton.

In a preferred variant of the invention, means ΔA are provided for adjusting the amplitude of the second control signal, together with phase-shifting means ΔΦ for adjusting the relative phase between the two control signals.

Figure 8A:
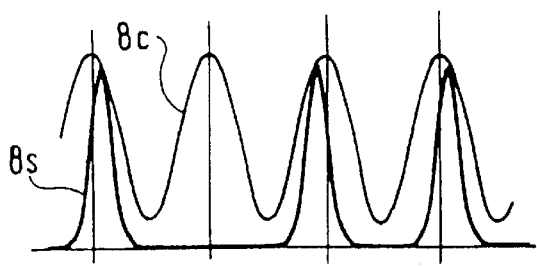
FIGS. 8A and 8B are diagrams showing waveforms of a soliton signal and of two control signals, respectively at points A and B of the NOLM in the FIG. 7 modulator, the control signals having the same frequency as the soliton signal.
Figure 8B:
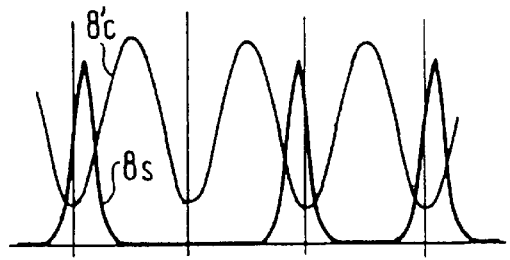

In the example shown in FIG. 7, the clock recovery means provide a clock signal at a frequency equal to the nominal bit frequency of the solitons in the signal to be regenerated. Nevertheless, the Gordon-Haus jitter due to random phase shifting between solitons and the clock is shown in FIGS. 8A and 8B. The curves shown in FIGS. 8A and 8B are diagrams showing examples of the waveforms of the soliton signal $8s$ and of two control signals $8c$ and $8'c$, respectively at points A and B of the NOLM in the FIG. 7 modulator, the control signals having the same frequency as the soliton signal. In a preferred configuration as shown in these figures, the two control signals have a relative phase shift of $\pi$.

Figure 9A:
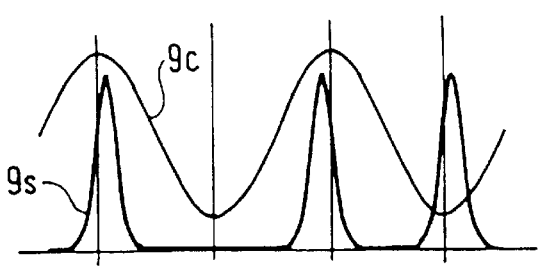
FIGS. 9A and 9B are diagrams showing waveforms of the soliton signal and of the two control signals respectively at points A and B of the NOLM in the FIG. 7 modulator, the control signals being at a frequency that is equal to half the frequency of the soliton signal.
Figure 9B:
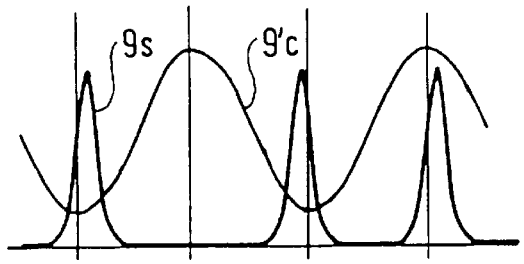

FIGS. 9A and 9B are diagrams showing the waveforms of the soliton signal and of the two control signals, as taken respectively from points A and B of the NOLM in the FIG. 7 modulator, with the control signals being at a frequency equal to half the frequency of the soliton signal. To minimize the effect of interactions between adjacent solitons as they propagate along distances, it is known (e.g. from document D6) to use a clock signal having phase inversion between successive solitons in a train of bits. To do this, it is possible for example to take a clock signal at a frequency $f_c$ that is half the frequency $f_o$ of the soliton signal: $f_c = f_s/2$. As in FIGS. 8A and 8B, the waveforms of the soliton signal $9s$ and of the two control signals $9c$ and $9'c$ at the points A and B respectively of the NOLM in the FIG. 7 modulator, the control signals having the same frequency as the soliton signal. As before, the two control signals are at a relative phase shift of $\pi$.

The effects of interactions between solitons are shown in FIG. 10 which shows the results of digital simulation of the quality factor Q as a function of link distance D over transoceanic distances, in four different cases:

a pseudo-random signal regenerated with intensity modulation only (IMPRBS);

a signal made up of a simply alternating bit train 1010..., regenerated with intensity modulation only (IM1010);

a signal made up of a simply alternating bit train 1010..., regenerated with phase and amplitude modulation by means of a NOLM of the invention having two control inlets (NOLM1010), with $P_c/P_\pi=0.2$ on each inlet; and a pseudo-random signal regenerated with phase and amplitude modulation by means of a NOLM of the invention having two control inlets (NOLMPRBS), with $P_c/P_\pi=0.2$ on each inlet.

It can be seen that in general the figure for the quality factor of the alternating bit sequence is greater than that of pseudo-random sequences for both types of modulation. The reason is that collisions between adjacent solitons do not happen with alternating sequences, unlike with pseudo-random sequences. Any collisions that may take place between adjacent bits in pseudo-random sequences reduce the quality factor Q. In contrast, it can also be seen that the effect of collisions is considerably reduced when applying amplitude and phase modulation by means of a NOLM of the invention having two control inlets, compared with applying intensity modulation only. This constitutes one of the advantages over the prior art of a NOLM having two control inlets.

Figure 11:
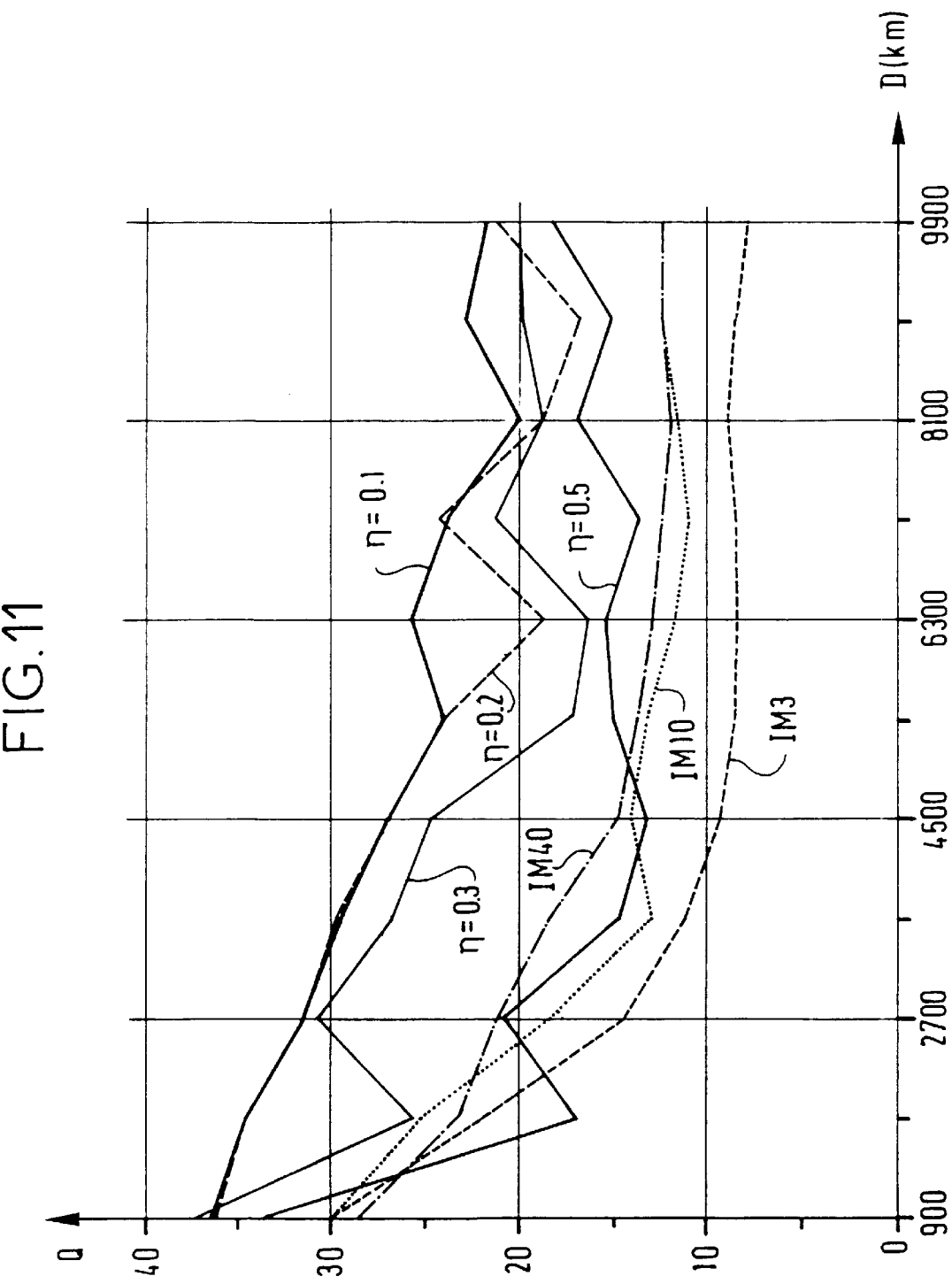
FIG. 11 shows the results of digital simulation of the quality factor Q as a function of link length D over transoceanic distances for various values of the control power $p_c$ of a single control NOLM, and for an intensity modulator followed by an optimal filter.

The simulations of FIGS. 10 and 11 were performed using identical values for the following parameters:

| | |
|---|---|
| bit rate | B = 20 Gbit/s |
| distance between amplifiers | $Z_a$ = 45 km |
| distance between regenerators | $Z_r$ = 450 km, one filter per regenerator |
| fiber dispersion | $\Delta t_g$ = 0.25 ps/nm/km |
| soliton power | $P_{in}$ = 1.0 (nominal soliton power) |
| soliton pulse width | $\Delta t_{FWHM}$ = 10 ps |
| inlet coupling coefficient | $\xi$ = 50% |

FIG. 11 shows the results of digitally simulating the quality factor Q as a function of the link length D over transoceanic distances for various values of control power $P_c/P_\pi$ applied to a NOLM having single control and also for an intensity modulator followed by an optimum filter. It can be seen that for all values of $\eta=P_c/P_\pi$, for which values are given in curves labelled $\eta=0.1$, $\eta=0.2$, $\eta=0.3$, and $\eta=0.5$, there is an improvement in the quality Q for very long links compared with curves IM40, IM10, and IM3 respectively representing 40 dB, 10 dB, and 3 dB intensity modulation. In contrast, there can also be seen that improvement is sensitive to the power of the control signal and that the improvement in Q increases for lower values of control power. There is another drawback of such apparatus, in that it is highly sensitive to ambient conditions (temperature, vibration, etc.).

Figure 12:
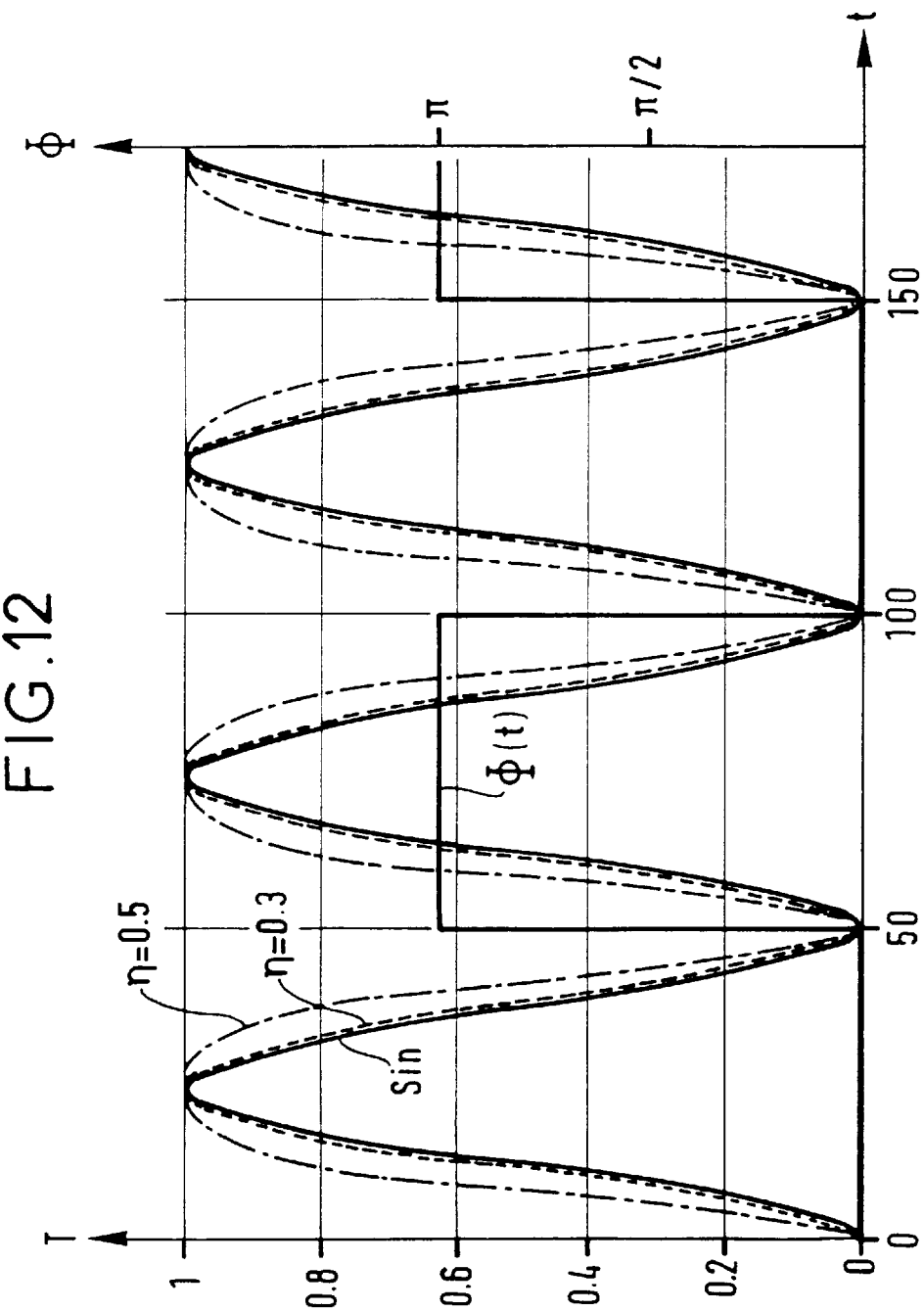
FIG. 12 is a diagram of the transmittance of a two-control NOLM of the invention also showing the phase of the control signal as a function of time for various values of the power of the control signal $P_c$ compared with the power $P_\xi$ required for maximum switching.

FIG. 12 is a diagram showing the transmittance T of a NOLM of the invention having two control inlets, and also showing the phase Φ of the control signal, as a function of time for different values of control signal power $P_c$ compared with the power $P_\pi$ required for maximum switching ($\eta=P_c/P_\pi$). The frequency f of the control signal is equal to half the bit frequency of the signal: $f=f_0/2$. It can be seen that for $\eta=0.5$, transmittance is almost sinusoidal. For $\eta=0.3$, transmittance is even closer to a sinewave. For $\eta=0.2$, transmittance coincides with a sinewave.

Another advantage of the apparatus of the invention can be seen by comparing FIG. 12 with FIG. 6: the phase Φ is practically constant (no "chirp") throughout the clock period, either at a value $\pi$ or at a value 0.

Figure 13:
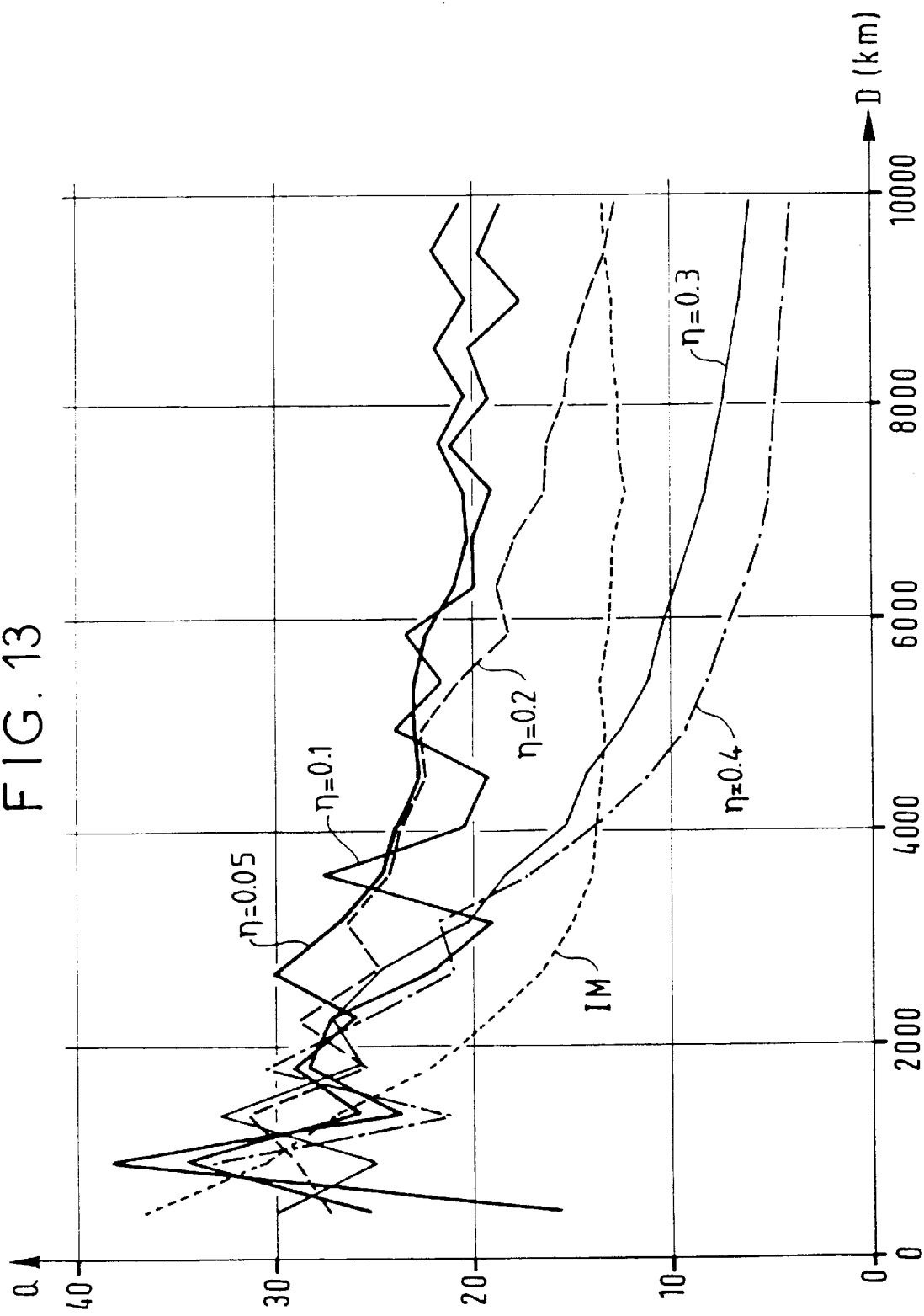
FIG. 13 shows the results of digital simulator of the quality factor Q as a function of link length D over transoceanic distances for various values of the control power $P_c$ applied to a conventional single-control NOLM of the prior art.

FIG. 13 shows the results of digitally simulating the quality factor Q as a function of link distance D over transoceanic distances of the order of 10,000 km, for various values of control power $P_c$; i.e. for various values of switching efficiency $\eta=P_c/P_\pi$, for a conventional NOLM having a single control. The results of the simulation show once more that the smallest values of $\eta$ are the most advantageous for obtaining best quality Q over long distance links. A curve IM giving the results for intensity modulation on its own is given by way of comparison.

The simulation of FIG. 13 uses the same parameter values as the simulations of FIGS. 10 and 11: bit rate 20 Gbit/s, link of D km made up of a plurality of 45 km lengths with EDFA amplifiers located between lengths to cover a total of 9,900 km. Fiber attenuation is fixed at $\alpha=0.23$ dB/km and the chromatic dispersion of a conventional fiber is fixed at $\Delta t_g=0.25$ ps/nm/km. At each EDFA, amplified spontaneous emission (ASE) is added to the signal, and gain is adjusted to deliver constant power. The signal is a pseudo-random binary sequence (PRBS) of 128 bits of 10 ps duration each, encoded using soliton pulses of conventional sech$^2$ shape.

FIG. 14 shows the results of digital simulation of the quality factor Q as a function of link length D over transoceanic distances, for various values of control power $P_c$ applied in phase opposition to the two control inlets of an optical modulator NOLM of the invention. The curves are labelled with the value $\eta_{eff}=P_{c1}+P_{c2}=2P_c$ for equal control signal power on both control inlets of the NOLM of the invention. Curve IM shows the results of intensity modulation alone and is given by way of comparison.

These results are to be compared with those of FIG. 13 to show the advantages of the invention. For all values of $\eta$, the quality factors Q are greater than those that result from pure intensity modulation (IM). As in the case of FIG. 13, high values of $\eta$ correspond to smaller quality factors Q. Also, for all values of $\eta$, results are better than when using single control, as is shown in FIG. 13. The apparatus of the invention is also less sensitive to variations in performance due to the surroundings: temperature, vibration, etc.

In addition, it can be seen that the results obtained are considerably less sensitive to the control power values $\eta$ since for all values of $\eta \leq 0.8$, the quality Q is substantially the same. This gives rise to another advantage of the apparatus of the invention concerning insertion losses. The insertion losses of an in-line modulator or regenerator apparatus are critical concerning the fiber propagation distance that can be accepted between such apparatuses. The insertion losses of an electroabsorption modulator may be as great as 18 dB, for example. We have shown with the help of FIG. 11 that the performance of a single control inlet NOLM modulator is better in terms of quality factor Q for relatively low control power of the order of $\eta$=0.1 or 0.2. Unfortunately, at low control powers, a NOLM exhibits greatest losses, which may be as great as 10 dB for example. In contrast, with a NOLM having two control inlets, it is possible to use a control power of the order of $\eta$=0.8 to 1.0, and insertion losses can drop to around 3 dB to 5 dB.

The embodiments of the invention described above are given as non-limiting examples of a NOLM optical modulator having two control signals, enabling amplitude modulation and phase modulation that are independently controllable over a certain range of values. The person skilled in the art will be capable of varying the concept to adapt to multiple applications in various embodiments without thereby going beyond the ambit of the present invention as defined by the following claims.

We claim:

1. An optical signal amplitude modulator for amplitude modulating an optical signal, said modulator comprising:
    a control signal generator for generating a first optical control signal at a frequency synchronized to said optical signal; and
    a non-linear optical loop mirror or "NOLM", said NOLM including an optical fiber loop receiving said optical signal as an inlet signal and providing an amplitude modulated signal as an outlet signal, said NOLM further including a first signal inlet/outlet optical coupler having a coupler coefficient of $\xi/(1-\xi)$ for coupling said inlet and said outlet signals to said loop, said NOLM further including a first control inlet and a second optical coupler for coupling said first control inlet to said loop in order to enable said first optical control signal to be injected into said loop in a first propagation direction, wherein said NOLM further includes a second control inlet and a third optical coupler in order to enable a second optical control signal to be injected into said loop in a second propagation direction different from said first direction.

2. An optical modulator according to claim 1, further including means for adjusting the relevant amplitude of said first and second optical control signals.

3. An optical modulator according to claim 1, further including means for adjusting the relative phase of said first and second optical control signals.

4. An optical modulator according to claim 1, further including at least one light source for generating said first and second optical control signals.

5. An optical modulator according to claim 4, wherein said at least one light source is adapted to generate a periodic control signal that is approximately or substantially sinusoidal.

6. An optical modulator according to claim 5, wherein said at least one light source is a single source, and wherein said modulator further includes a fourth optical coupler enabling said periodic control signal to be split into two, thereby creating said first and second optical control signals.

7. An optical modulator according to claim 1, wherein the relative phase between said first and second optical control signals is approximately $\pi$.

8. A method of regenerating solitons in which solitons to be regenerated are injected to the signal inlet of a NOLM via a first inlet/outlet optical coupler having a coupling coefficient of $\xi/(1-\xi)$, while a first optical control signal is injected into the NOLM in a first propagation direction via a second optical coupler in order to modulate said solitons by said first optical control signal and to deliver said solitons modulated in this way via said first optical coupler, wherein a second optical control signal is injected into the NOLM in a second propagation direction via a third optical coupler, the second propagation direction being different from the first, and said first and second optical control signals having a relative phase shift of approximately $\pi$.

9. A method according to claim 8, wherein said first and second optical signals have a waveform that is approximately sinusoidal.

10. The use of an optical modulator apparatus according to claim 1 for regenerating solitons.

11. The use of an optical modulator apparatus according to claim 1 for modifying the spectral characteristics of pulses.

12. An optical signal amplitude modulator comprising:
    a control signal generator for generating first and second substantially sinusoidal optical control signals; and
    a non-linear optical loop mirror (NOLM), said NOLM comprising:
        an optical fiber loop comprising an inlet for receiving an inlet signal, an outlet for providing an outlet signal and a first signal inlet/outlet optical coupler for coupling said inlet and said outlet to said loop;
        a first control inlet and associated second optical coupler for coupling said first optical control signal to said loop to enable said first optical control signal to be injected into said loop in a first propagation direction; and
        a second control inlet and associated third optical coupler for coupling said second optical control signal to said loop to enable said second optical control signal to be injected into said loop in a second propagation direction different from said first direction.

13. An optical modulator according to claim 12, further comprising means for adjusting a relative amplitude of said first and second optical control signals.

14. An optical modulator according to claim 12, further comprising means for adjusting a relative phase of said first and second optical control signals.

15. An optical modulator according to claim 12, further comprising at least one light source for generating said first and second optical control signals.

16. An optical modulator according to claim 15, wherein said at least one light source is a single source generating a periodic control signal, and wherein said modulator further comprises a fourth optical coupler for splitting said periodic control signal, thereby creating said first and second optical control signals.

17. An optical modulator according to claim 14, wherein the relative phase between said first and second optical control signals is approximately $\pi$.

18. An optical modulator according to claim 1, wherein the power levels of said first and second optical control signals is no more than approximately 80 percent of a power level desirable for optimum switching of said optical signal.

19. An optical modulator according to claim 1, wherein the phase of said first and second optical control signals differs from the phase of said optical signal by 180 degrees.

20. An optical modulator according to claim 1, wherein the wavelength of said first and second optical control signals differs from the wavelength of said optical signal enabling a bandpass filter to subsequently separate the three signals.

* * * * *